US012118900B2

(12) United States Patent
Huenefeld

(10) Patent No.: US 12,118,900 B2
(45) Date of Patent: Oct. 15, 2024

(54) SIGN ASSEMBLY WITH REMOVABLE SIGN PANEL AND RELATED METHOD

(71) Applicant: Dee Sign USA, LLC, West Chester, OH (US)

(72) Inventor: Braden Huenefeld, Cincinnati, OH (US)

(73) Assignee: DEE SIGN USA, LLC, West Chester, OH (US)

( * ) Notice: Subject to any disclaimer, the term of this patent is extended or adjusted under 35 U.S.C. 154(b) by 114 days.

(21) Appl. No.: 17/954,916

(22) Filed: Sep. 28, 2022

(65) Prior Publication Data

US 2024/0105086 A1 Mar. 28, 2024

(51) Int. Cl.
*G09F 7/08* (2006.01)
*G09F 15/00* (2006.01)
*G09F 19/22* (2006.01)
*G09F 7/18* (2006.01)

(52) U.S. Cl.
CPC ........ *G09F 15/0012* (2013.01); *G09F 19/228* (2013.01); *G09F 2007/1843* (2013.01)

(58) Field of Classification Search
CPC ..... G09F 3/20; G09F 7/02; G09F 7/10; G09F 7/18; G09F 7/08
See application file for complete search history.

(56) References Cited

U.S. PATENT DOCUMENTS

| | | | | | |
|---|---|---|---|---|---|
| 1,359,510 | A * | 11/1920 | Kornicker | G09F 7/08 40/618 |
| 1,862,776 | A | 6/1932 | Timberlake | |
| 2,865,124 | A | 12/1958 | Domenico | |
| 3,079,714 | A * | 3/1963 | Zeigler | G09F 7/08 D20/17 |
| 3,132,431 | A | 5/1964 | Petrie | |
| 3,531,884 | A * | 10/1970 | Adler | G09F 7/10 40/618 |
| 3,742,633 | A * | 7/1973 | Palm | G09F 7/08 40/576 |
| 4,885,860 | A | 12/1989 | Huenefeld | |
| 4,916,840 | A | 4/1990 | Getz | |
| 5,065,537 | A * | 11/1991 | Bailey | G09F 7/12 40/621 |
| 5,083,390 | A | 1/1992 | Edman | |
| 5,113,627 | A | 5/1992 | Jarrett, Jr. | |

(Continued)

*Primary Examiner* — Cassandra Davis
(74) *Attorney, Agent, or Firm* — THOMPSON HINE LLP

(57) ABSTRACT

A sign frame includes spaced apart first and second upright frame members, a first lateral frame member extending between the first upright frame member and the second upright frame member, and a second lateral frame member extending between the first upright frame member and the second upright frame member, the second lateral frame member spaced vertically below the first lateral frame member to define a sign panel receiving space therebetween. The first lateral frame member includes a lower side with a downward facing panel receiving slot. The second lateral frame member includes an upper side with an upward facing panel receiving slot. The downwardly facing panel receiving slot is sized and configured for permitting an upper edge section of a sign panel to be shifted upward and pivotably moved within the downwardly facing panel receiving slot.

10 Claims, 5 Drawing Sheets

(56) References Cited

U.S. PATENT DOCUMENTS

| | | | | | |
|---|---|---|---|---|---|
| 5,148,925 | A | * | 9/1992 | Althoff | A47F 5/0853 211/94.01 |
| 5,207,402 | A | | 5/1993 | Berry-Tremmel | |
| 5,372,263 | A | * | 12/1994 | Niekel | G11B 33/0438 211/41.12 |
| 5,485,926 | A | * | 1/1996 | Kundert | G11B 33/0483 312/9.9 |
| 5,579,599 | A | | 12/1996 | Haeseler | |
| 5,617,660 | A | | 4/1997 | Pollack | |
| 6,092,320 | A | * | 7/2000 | Bringuet | G09F 7/10 40/661.03 |
| D535,700 | S | | 1/2007 | Huenefeld | |
| D537,884 | S | | 3/2007 | Huenefeld | |
| D538,352 | S | | 3/2007 | Huenefeld | |
| 7,430,343 | B2 | | 9/2008 | Hayes | |
| 8,959,813 | B2 | | 2/2015 | Denby | |
| 10,867,529 | B2 | | 12/2020 | Huenefeld | |
| 2002/0007577 | A1 | | 1/2002 | Padiak | |
| 2003/0168569 | A1 | | 9/2003 | Simson | |
| 2005/0269466 | A1 | | 12/2005 | Conway | |
| 2006/0010741 | A1 | | 1/2006 | Simson | |
| 2009/0077849 | A1 | | 3/2009 | Glass, Jr. | |
| 2009/0165346 | A1 | | 7/2009 | Garfinkle | |
| 2009/0229156 | A1 | | 9/2009 | Gettelfinger | |
| 2012/0000106 | A1 | | 1/2012 | Wick | |
| 2012/0110883 | A1 | | 5/2012 | White | |
| 2012/0144707 | A1 | | 6/2012 | Garfinkle | |
| 2013/0008065 | A1 | | 1/2013 | Danielson | |
| 2018/0328069 | A1 | | 11/2018 | Foltz | |
| 2020/0143714 | A1 | | 5/2020 | Gonzalez | |

* cited by examiner

SIGN ASSEMBLY WITH REMOVABLE SIGN PANEL AND RELATED METHOD

TECHNICAL FIELD

This application relates generally to signs, and more particularly to yard signs.

BACKGROUND

Yard signs are used for a variety of different purposes, such as to advertise the sale of homes. A realtor's signage or placard is placed in a sign frame which is then placed in the yard of the home to be sold.

Various sign configurations exist, including metal bar-type signs. More aesthetically appealing signs of extruded plastic framing are also known, and tend to be used for higher end purposes (e.g., more valuable properties). One difficulty encountered with such plastic frame signs is the requirement to disassemble the sign to change out the sign panel(s) held by the sign frame.

Accordingly, it would be desirable to provide a sign assembly that facilitates changeout of sign panels.

SUMMARY

In one aspect, a sign assembly includes a frame comprising spaced apart first and second upright frame members, a first lateral frame member extending between the first upright frame member and the second upright frame member, and a second lateral frame member extending between the first upright frame member and the second upright frame member, the second lateral frame member spaced vertically below the first lateral frame member to define a sign panel receiving space therebetween. A sign panel is disposed in the sign panel receiving space. The first lateral frame member includes a lower side with a downward facing slot and the second lateral frame member includes an upper side with an upward facing slot. The sign panel includes a lower edge section engaged in the upward facing slot and an upper edge section engaged in the downward facing slot. The downwardly facing slot is sized to permit the sign panel to be shifted upward such that the lower edge section of the sign panel is moved upward and out of the upwardly facing slot into a position to permit the lower edge section of the sign panel to move in a first depthwise direction along a depth of the frame.

In another aspect, a sign frame includes spaced apart first and second upright frame members, a first lateral frame member extending between the first upright frame member and the second upright frame member, and a second lateral frame member extending between the first upright frame member and the second upright frame member, the second lateral frame member spaced vertically below the first lateral frame member to define a sign panel receiving space therebetween. The first lateral frame member includes a lower side with a downward facing panel receiving slot, and the second lateral frame member includes an upper side with an upward facing panel receiving slot. The downwardly facing panel receiving slot is sized and configured for permitting an upper edge section of a sign panel to be shifted upward and pivotably moved within the downwardly facing panel receiving slot.

The details of one or more embodiments are set forth in the accompanying drawings and the description below. Other features, objects, and advantages will be apparent from the description and drawings, and from the claims.

DETAILED DESCRIPTION

Figure 1:
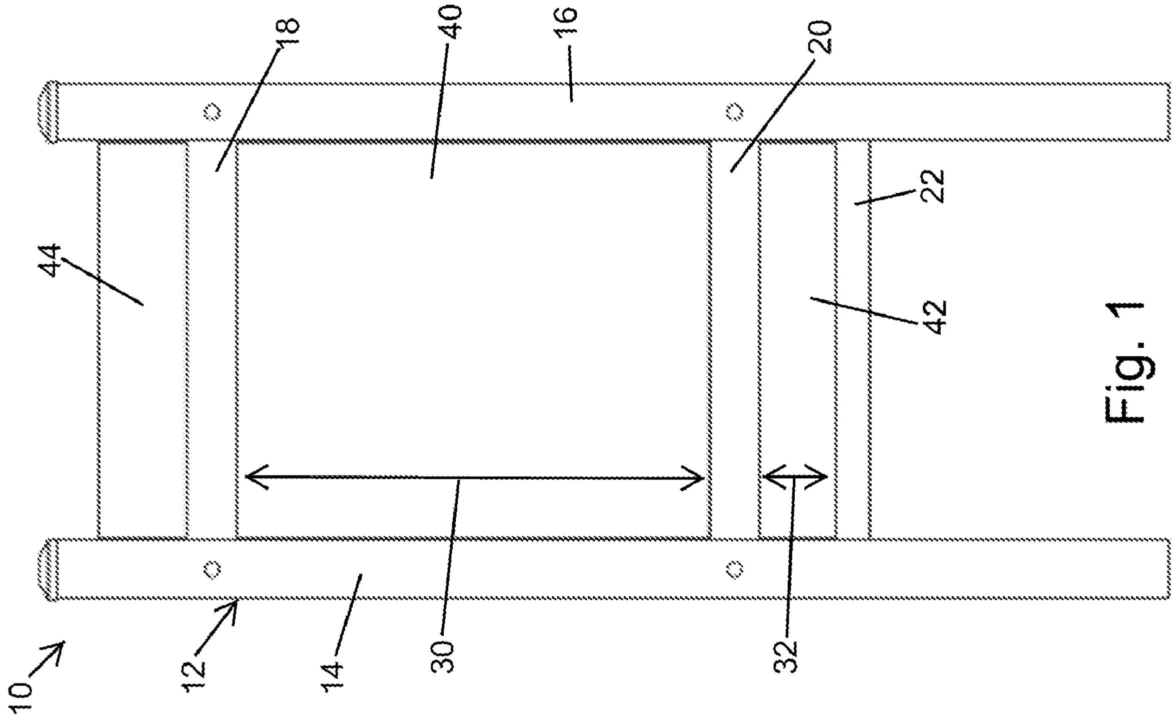
FIGS. 1 and 2 are front elevation views of a sign assembly.
Figure 2:
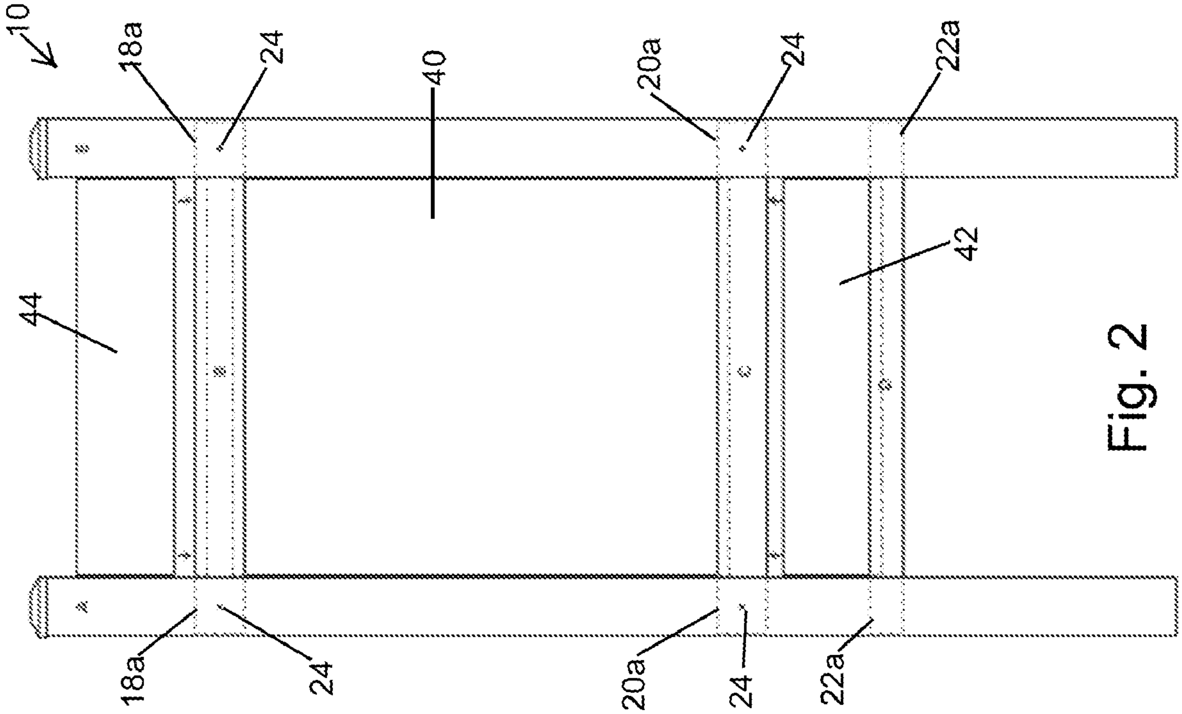

Referring to FIGS. 1-8, one embodiment of a sign assembly 10 is shown and includes a frame 12 that includes spaced apart upright frame members 14 and 16, and lateral frame members 18, 20 and 22 extending between the upright frame members 14 and 16. All of the frame members may be formed by plastic extrusions cut to desired length. By way of example, the upright frame members may include side cut-outs into which the free end sections 18*a*, 20*a* and 22*a* of the lateral frame members extend, with fasteners 24 extending depthwise along the frame and rigidly fixing the lateral frame members in place. However, other embodiments, such as welding of the frame members together (e.g., by ultrasonic welding or plastic overweld) are also possible.

The lateral frame member 20 is spaced vertically below the lateral frame member 18 to define a sign panel receiving space 30 therebetween, and the lateral frame member 22 is spaced vertically below the lateral frame member 20 to define a further sign panel receiving panel space 32 therebetween. A sign panel 40 disposed in the sign panel receiving space 30, and a further sign panel 42 is disposed in the sign panel receiving space 32. Un upper sign panel 44 is located atop the lateral frame member 18.

Figure 5:
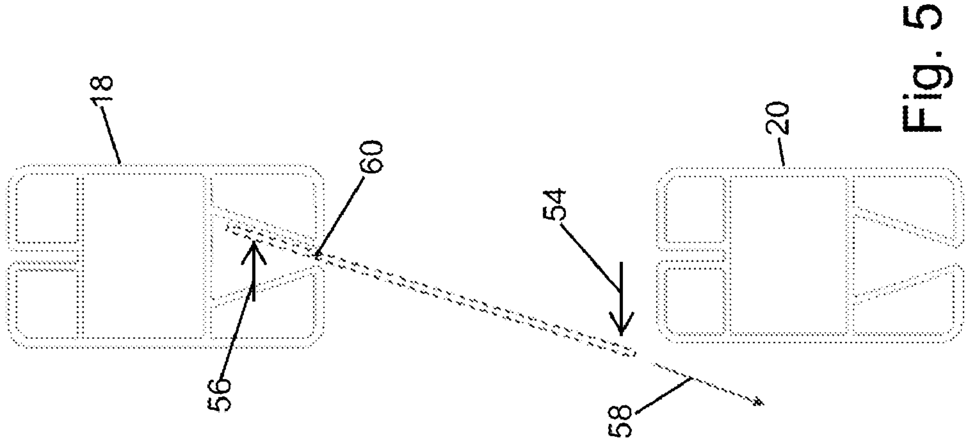
FIGS. 3-5 are side cross-sections of part of the sign assembly, demonstrating sign panel removal.
Figure 4:
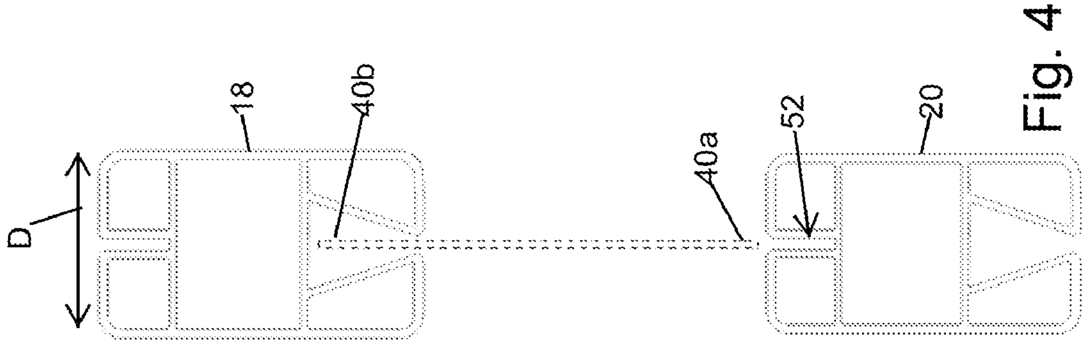
Figure 3:
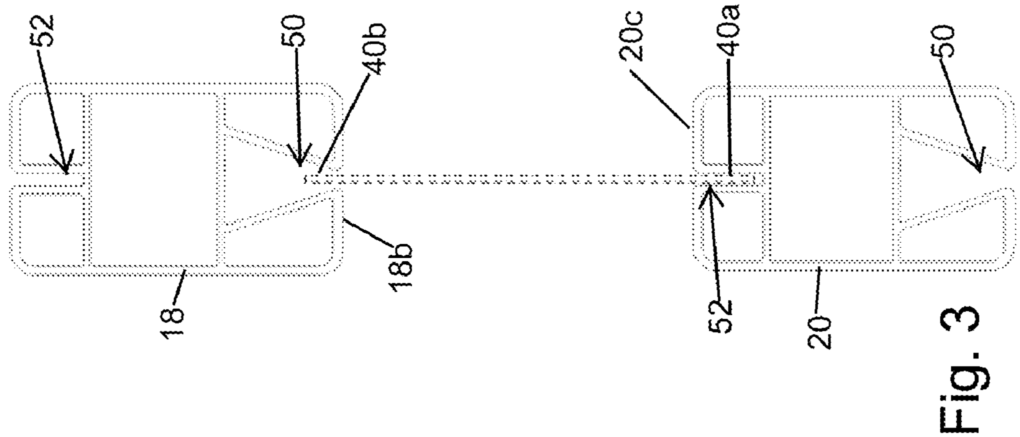
Figure 7:
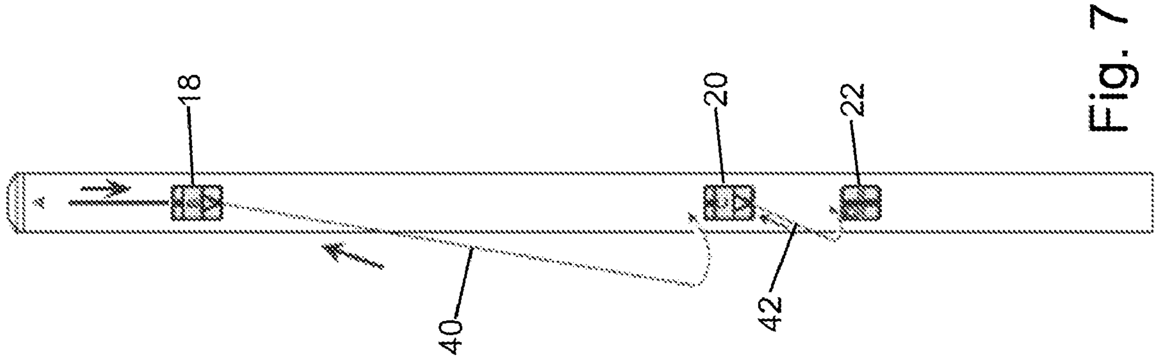
FIG. 7 is a side cross-section of the sign assembly depicting installation of the sign panels.
Figure 6:
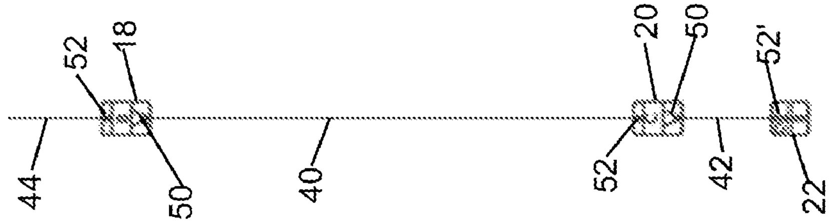
FIG. 6 is a side cross-section of parts of the sign assembly.

Per FIGS. 3-5, where the height of the sign panel 40 is reduced for the purpose of illustration, the lateral frame member 18 includes a lower side 18*b* with a downward facing slot 50, and the lateral frame member 20 includes an upper side 20*c* with an upward facing slot 52. The sign panel 40 includes a lower edge section 40*a* engaged in the upward facing slot 52 and an upper edge section 40*b* engaged in the downward facing slot 50. The downwardly facing slot 50 is sized to permit the sign panel 40 to be shifted upward (per FIG. 4) such that the lower edge section 40*a* of the sign panel is moved upward and out of the upward facing slot 52, into a position to permit the lower edge section of the sign panel to move in a depthwise direction (e.g., per arrow 54) along a depth D of the frame. The downwardly facing panel slot 50 is also configured to permit the upper edge section 40*b* of the sign panel to shift in a depthwise direction (per arrow 56), opposite the depthwise direction 54, along the depth D of the frame, when the lower edge section 40*a* moves in the depthwise direction 54. The overall movement of the sign panel 40, from the position of FIG. 4 to the position of FIG. 5, is thus a pivoting movement. Once the sign panel 40 is in the position of FIG. 5, it can be moved downward, per arrow 58, to remove the sign panel 40 from the sign assembly.

Installing a new sign panel involves the reverse process. Specifically, positioning a sign panel in the angled orientation of FIG. 5 and moving the sign panel up into the downward facing slot 50, then pivoting the sign panel such that the lower edge section aligns with the upward facing slot 52, and the shifting the sign panel downward such that the lower edge section engages into the upward facing slot, while the upper edge section also remains in the downward facing slot.

Figure 8:
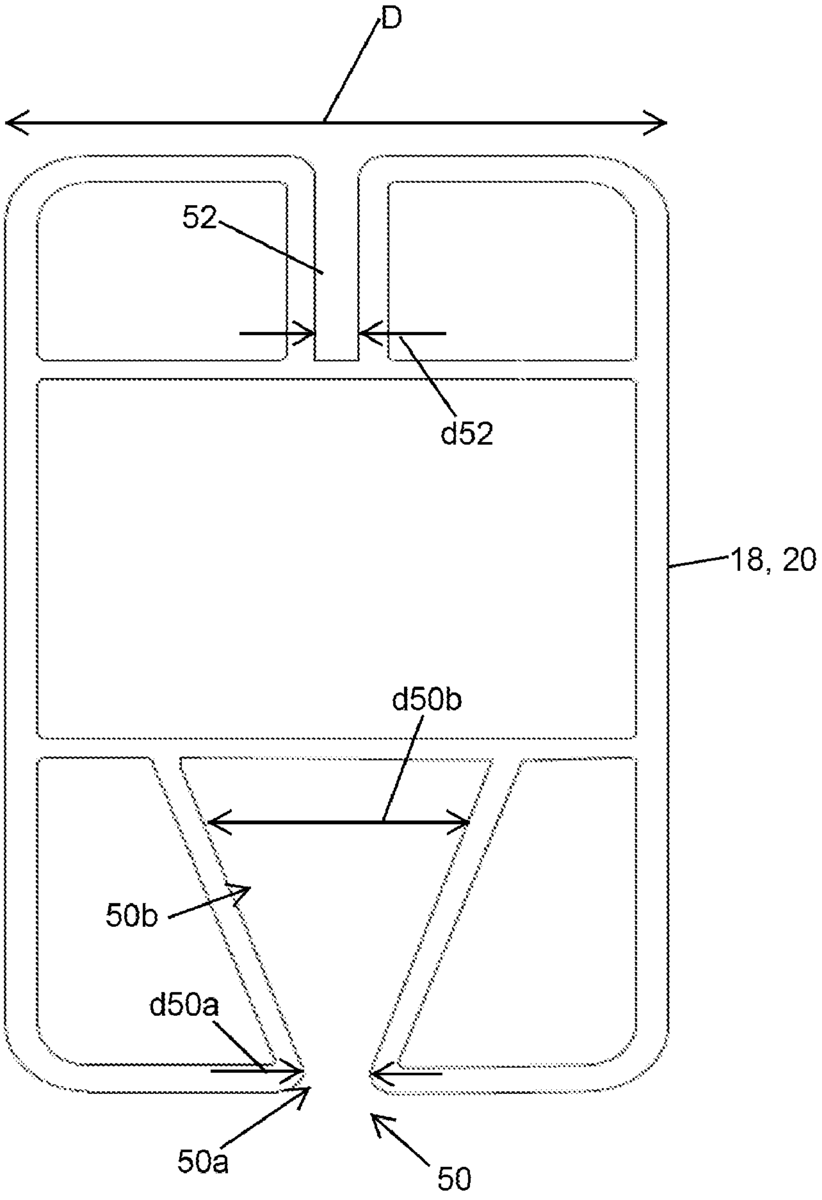
FIG. 8 is a cross-section showing the profile of the upper lateral frame members of the sign assembly.

Here, as best seen in FIG. 8, the downward facing slot 50 comprises a lower entry section 50*a* and an upper section 50*b*. The lower entry section 50 has a depth dimension d50*a* that is smaller than a depth dimension d52*a* of the upper section 50*b*. The sign panel 40 pivots about a pivot axis 60, which may shift slightly but is located in a region of the lower entry section 50*a*, when the lower edge section of the sign panel moves in the depthwise direction 54 and the upper edge section of the sign panel moves in the depthwise direction 56. The lower entry section 50*a* of the downwardly facing slot defines the smallest depth dimension of the slot, and the upper section 50*b* varies in depth along its height. Here, the upper section 50*b* has a trapezoidal shape in a cross-section in a plane the runs parallel to the depth of the frame, but other shapes are also possible.

Notably, in the illustrated embodiment, the lateral frame member 20 is of the same configuration as the lateral frame member 18 and therefore also includes a downward facing slot 50 that is similar in shape and function to the downwardly facing slot of 50 of lateral frame member 18. The lateral frame member 22 includes a linear upward facing slot 52', such that the sign panel 42 (commonly referred to as the bottom rider) can be similarly removed and replaced for changeout purposes (e.g., per FIG. 7).

The upward facing slot 52 in the lateral frame member 18 holds the lower edge section of the upper sign panel 44 (commonly referred to as the top rider).

Here, the upward faxing slots 52 have a depth dimension d52 that is slightly greater than the thickness of the sign panels, and the depth dimension d50*a* of the lower entry section 50*a* of the downwardly facing slots is greater than depth dimension d50*a* (e.g., 40-50% greater), which facilitates the pivoting action of the sign panels.

The described sign assembly enables a method of sign use that permits sign panel changeout with disassembly of the sign frame. In particular, a method of modifying a sign assembly involves utilizing a sign assembly that includes a first lateral frame member and a second lateral frame member, the second lateral frame member spaced vertically below the first lateral frame member to define a sign panel receiving space therebetween, a first sign panel positioned in the sign panel receiving space with a lower edge section of the first sign panel engaged in an upward facing slot of the second lateral member and an upper edge section of the first sign panel engaged in a downward facing slot of the first lateral frame member. The first sign panel is shifted upward, further into the downwardly facing slot, such that the lower edge section of the first sign panel is moved upward and out of the upwardly facing slot. After the shifting, the first sign panel is pivoted such that the lower edge section of the first sign panel pivots into a position offset from the second lateral member while the upper edge section of the first sign panel pivots within the downwardly facing slot. After the pivoting, the first sign panel is moved downward out of the downwardly facing slot to remove the first sign panel from the sign assembly.

A replacement, second sign panel can then be installed by holding the second sign panel at an angle and position that enables the upper edge section of the second sign panel to be shifted up into the downwardly facing slot. The second sign panel is then pivoted to bring the lower edge section of the second sign panel into alignment with the upward facing slot, and the sign panel is then shifted downward into the upwardly facing slot.

Figure 9:
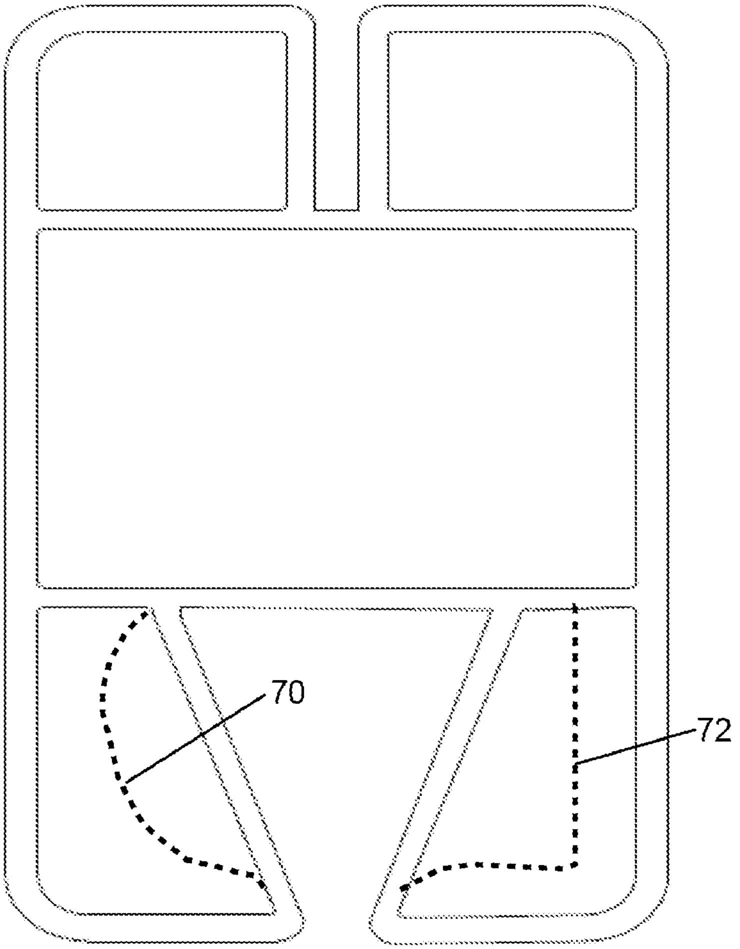
FIG. 9 is a cross-section showing alternative profile configurations of the downwardly facing slots of the upper lateral frame members.

It is to be clearly understood that the above description is intended by way of illustration and example only, is not intended to be taken by way of limitation, and that other changes and modifications are possible. For example, as noted above, other profile shapes of the downwardly facing slot are possible, such as exemplary shapes 70 and 72 shown in FIG. 9. Still other variations are possible.

What is claimed is:

1. A sign assembly, comprising:

a frame comprising spaced apart first and second upright frame members;

a first lateral frame member extending between the first upright frame member and the second upright frame member;

a second lateral frame member extending between the first upright frame member and the second upright frame member, the second lateral frame member spaced vertically below the first lateral frame member to define a sign panel receiving space therebetween;

a sign panel disposed in the sign panel receiving space;

wherein the first lateral frame member includes a lower side with a downwardly facing slot;

wherein the second lateral frame member includes an upper side with an upward facing slot;

wherein the sign panel includes a lower edge section engaged in the upward facing slot and an upper edge section engaged int the downwardly facing slot;

wherein the downwardly facing slot is sized to permit the sign panel to be shifted upward such that the lower edge section of the sign panel is moved upward and out of the upwardly facing slot into a position to permit the lower edge section of the sign panel to move in a first depthwise direction along a depth of the frame;

wherein the downwardly facing slot is configured to permit the upper edge section of the sign panel to shift in a second depthwise direction, opposite the first depthwise direction, along the depth of the frame, when the lower edge section moves in the first depthwise direction;

wherein the downwardly facing slot comprises a lower entry section and an upper section, wherein the lower entry section has a depth dimension that is smaller than a depth dimension of the upper section.

2. The sign assembly of claim 1, wherein the sign panel pivots about a pivot axis in a region of the lower entry section when the lower edge section of the sign panel moves in the first depthwise direction and the upper edge section of the sign panel moves in the second depthwise direction.

3. The sign assembly of claim 1, wherein the lower entry section has a substantially uniform depth along its height, and the upper section varies in depth along its height.

4. The sign assembly of claim 3, wherein the upper section has a trapezoidal shape in a cross-section in a plane the runs parallel to the depth of the frame.

5. The sign assembly of claim 3, wherein the first lateral frame member and the second lateral frame member are formed of tubular plastic extrusions.

6. The sign assembly of claim 1, further comprising:

a third lateral frame member extending between the first upright frame member and the second upright frame member, the third lateral frame member spaced vertically below the second lateral frame member to define a further sign panel receiving space therebetween;

a further sign panel disposed in the further sign panel receiving space;

wherein the second lateral frame member includes a lower side with a downwardly facing slot;

wherein the third lateral frame member includes an upper side with an upward facing slot;

wherein the further sign panel includes a lower edge section engaged in the upward facing slot of the third lateral frame member and an upper edge section engaged in the downwardly facing slot of the second lateral frame member;

wherein the downwardly facing slot of the second lateral frame member is sized to permit the further sign panel to be shifted upward such that the lower edge section of the further sign panel is moved upward and out of the upwardly facing slot into a position to permit the lower edge section of the further sign panel to move in the first depthwise direction along the depth of the frame.

7. A sign frame, comprising:

spaced apart first and second upright frame members;

a first lateral frame member extending between the first upright frame member and the second upright frame member;

a second lateral frame member extending between the first upright frame member and the second upright frame member, the second lateral frame member spaced vertically below the first lateral frame member to define a sign panel receiving space therebetween;

wherein the first lateral frame member includes a lower side with a downwardly facing panel receiving slot;

wherein the second lateral frame member includes an upper side with an upward facing panel receiving slot;

wherein the downwardly facing panel receiving slot is sized and configured for permitting an upper edge section of a sign panel to be shifted upward and pivotably moved within the downwardly facing panel receiving slot;

wherein the downwardly facing slot comprises a lower entry section and an upper section, wherein the lower entry section has a depth dimension that is smaller than a depth dimension of the upper section.

8. The sign frame of claim 7, wherein the lower entry section has a substantially uniform depth along its height, and the upper section increases in depth along its height.

9. The sign frame of claim 7, wherein the upper section has a trapezoidal shape in a cross-section taken a plane that runs parallel to the depth of the frame.

10. A method of modifying a sign assembly, comprising:

utilizing a sign assembly that includes a first lateral frame member and a second lateral frame member, the second lateral frame member spaced vertically below the first lateral frame member to define a sign panel receiving space therebetween, a first sign panel positioned in the sign panel receiving space with a lower edge section of the first sign panel engaged in an upward facing slot of the second lateral member and an upper edge section of the first sign panel engaged in a downwardly facing slot of the first lateral frame member, wherein the downwardly facing slot comprises a lower entry section and an upper section, wherein the lower entry section has a depth dimension that is smaller than a depth dimension of the upper section;

shifting the first sign panel upward, further into the downwardly facing slot, such that the lower edge section of the first sign panel is moved upward and out of the upwardly facing slot;

after the shifting, pivoting the first sign panel such that the lower edge section of the first sign panel pivots into a position offset from the second lateral member while the upper edge section of the first sign panel pivots within the upper section of the downwardly facing slot;

after the pivoting, moving the first sign panel out of the downwardly facing slot to remove the first sign panel from the sign assembly.

* * * * *